US011990082B2

(12) United States Patent
Zhang et al.

(10) Patent No.: US 11,990,082 B2
(45) Date of Patent: May 21, 2024

(54) ADAPTIVELY CONFIGURING IMAGE DATA TRANSFER TIME

(71) Applicant: QUALCOMM Incorporated, San Diego, CA (US)

(72) Inventors: Nan Zhang, Beijing (CN); Junzhi Zhao, Shenzhen (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/005,448

(22) PCT Filed: Aug. 17, 2020

(86) PCT No.: PCT/CN2020/109454
§ 371 (c)(1),
(2) Date: Jan. 13, 2023

(87) PCT Pub. No.: WO2022/036486
PCT Pub. Date: Feb. 24, 2022

(65) Prior Publication Data

US 2023/0267871 A1 Aug. 24, 2023

(51) Int. Cl.
*G09G 3/20* (2006.01)

(52) U.S. Cl.
CPC ... *G09G 3/2096* (2013.01); *G09G 2340/0435* (2013.01); *G09G 2360/18* (2013.01); *G09G 2370/00* (2013.01)

(58) Field of Classification Search
CPC ................. G09G 3/2096; G09G 5/001; G09G 2340/0435; G09G 2360/08;
(Continued)

(56) References Cited

U.S. PATENT DOCUMENTS

2015/0015551 A1* 1/2015 Honda ................. G09G 3/2096 345/204
2016/0078846 A1 3/2016 Liu et al.
(Continued)

FOREIGN PATENT DOCUMENTS

CN 106463094 A 2/2017
CN 108563605 A 9/2018

OTHER PUBLICATIONS

International Search Report and Written Opinion—PCT/CN2020/109454—ISA/EPO—dated May 13, 2021.
(Continued)

*Primary Examiner* — Nelson M Rosario
(74) *Attorney, Agent, or Firm* — QUALCOMM Incorporated

(57) ABSTRACT

The present disclosure provides methods and apparatus for configuring an image data transfer time for sending image data from a processor to a display panel along a display path. One method includes receiving, by the processor from the display panel, a display panel refresh interval indication indicating a display panel refresh interval of the display panel. The display panel refresh interval of the display panel corresponds to a time duration of a display period of the display panel. The display panel is configured to refresh each display period. The image data transfer time is computed based on the display panel refresh interval. One or more components of the display path are configured to support the computed image data transfer time.

40 Claims, 3 Drawing Sheets

(58) Field of Classification Search
CPC ........... G09G 2360/18; G09G 2370/00; G09G 2370/04; G09G 5/006; G09G 5/12; G09G 5/18; G09G 5/363; G09G 3/20; G09G 3/36; G09G 5/00; G09G 5/14; G09G 5/36; G09G 5/39; G06T 1/00; G06T 15/10; G06F 1/32; G06F 13/24; G06F 3/14; H04L 12/24; H04N 7/01
See application file for complete search history.

(56) References Cited

U.S. PATENT DOCUMENTS

| | | | | |
|---|---|---|---|---|
| 2016/0275916 | A1 | 9/2016 | Glen et al. | |
| 2018/0102105 | A1 | 4/2018 | Aoki | |
| 2019/0057647 | A1 | 2/2019 | Hack | |
| 2019/0114997 | A1* | 4/2019 | Okamoto | G09G 5/006 |
| 2019/0304389 | A1 | 10/2019 | Zhang | |

OTHER PUBLICATIONS

Supplementary European Search Report—EP20949699—Search Authority—Munich—Mar. 4, 2024.

* cited by examiner

ADAPTIVELY CONFIGURING IMAGE DATA TRANSFER TIME

CROSS-REFERENCE TO RELATED APPLICATIONS

This application is a national stage application under 35 U.S.C. 371 of PCT/CN2020/109454, filed Aug. 17, 2020, which is hereby expressly incorporated by reference herein in its entirety as if fully set forth below and for all applicable purposes.

TECHNICAL FIELD

The present disclosure relates generally to display panels and, more particularly, to one or more techniques for display or configuration for display panels.

BACKGROUND

Computing devices often use a graphics processing unit (GPU) to render graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

Frames output by the GPU, in certain aspects, are further processed by a display processing unit (DPU) of the computing device, which may then output image data to a display panel (e.g., a display client) configured to display or otherwise present frames processed by the DPU. For example, the display client includes a display to present images and a display controller (e.g., display driver integrated circuit (DDIC)) to control the display (e.g., refresh of the display).

The display panel, in certain aspects, may (e.g., selectively) operate in a video mode or a command mode. In the video mode, refresh of the display panel may be controlled by a host processor (e.g., DPU, GPU, and/or CPU). For example, the host processor may provide a refresh timeline/synchronization signal (e.g., a series of pulses, square wave, etc.) to the display controller, which refreshes the display according to the provided refresh timeline/synchronization signal (e.g., corresponding to a refresh frequency). In the command mode, the display panel may refresh based on a (e.g., self-) refresh timeline/signal (e.g., corresponding to a (e.g., self-) refresh frequency) generated by a display controller of the display panel itself (e.g., independent of the host processor).

Display failures, such as image jitter, may occur in the command mode. Jitter (or refresh jitter) may refer to the deviation from true periodicity of the display panel refresh interval. Video or image jitter may occur when portions of video image frames are displaced due to corruption of synchronization signals or transmission failure, such as, for example, when a display panel refresh interval becomes less than an image data transfer time.

Limited by hardware configurations of the display panel, such as the display controller, the operating temperature and/or aging of the display panel may cause substantial variations in the display panel refresh intervals (or the corresponding self-refreshing rates). Even with safety margins built-in for coping with the variations, failures in the display panel still occur when the display panel refresh intervals have excessive variations, resulting in image jitter.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

Certain aspects of the present disclosure provide a method for configuring an image data transfer time for sending image data from a processor to a display panel along a display path as discussed herein. The method includes receiving, by the processor from the display panel, a display panel refresh interval indication indicating a display panel refresh interval of the display panel. The display panel refresh interval of the display panel corresponds to a time duration of a display period of the display panel. The display panel is configured to refresh each display period. The method further comprises computing the image data transfer time based on the display panel refresh interval; and configuring one or more components of the display path to support the computed image data transfer time.

Certain aspects of the present disclosure provide a computing device including a processor, a display path, and a display panel. The processor is configured to receive, from the display panel, a display panel refresh interval indication indicating a display panel refresh interval of the display panel. The display panel refresh interval of the display panel corresponds to a time duration of a display period of the display panel. The display panel may be configured to refresh each display period. The processor is configured to compute an image data transfer time based on the display panel refresh interval. The image data transfer time is a time for sending image data from the processor to the display panel along the display path. The processor is configured to configure one or more components of the display path to support the computed image data transfer time.

Certain aspects of the present disclosure provide a computing device comprising means for receiving a display panel refresh interval indication indicating a display panel refresh interval of a display panel. The display panel refresh interval of the display panel corresponds to a time duration of a display period of the display panel. The display panel may be configured to refresh each display period. The computing device also includes means for computing the image data transfer time based on the display panel refresh interval. The image data transfer time is for sending image data to the display panel along a display path. The computing device further includes means for configuring one or more components of the display path to support the computed image data transfer time.

Certain aspects of the present disclosure provide a non-transitory computer readable medium storing instructions that when executed by a computing device as discussed herein cause the computing device to configure an image data transfer time for sending image data from a processor to a display panel along a display path. For example, the non-transitory computer readable medium stores instructions that, when executed by a computing device, cause the computing device to receive, by the processor from the display panel, a display panel refresh interval indication indicating a display panel refresh interval of the display panel. The display panel refresh interval of the display panel corresponds to a time duration of a display period of the display panel. The display panel may be configured to refresh each display period. The non-transitory computer readable medium stores instructions that, when executed by a computing device, further cause the computing device to compute the image data transfer time based on the display panel refresh interval; and configure one or more components of the display path to support the computed image data transfer time.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Like numerals indicate like elements.

DETAILED DESCRIPTION

Figure 1:
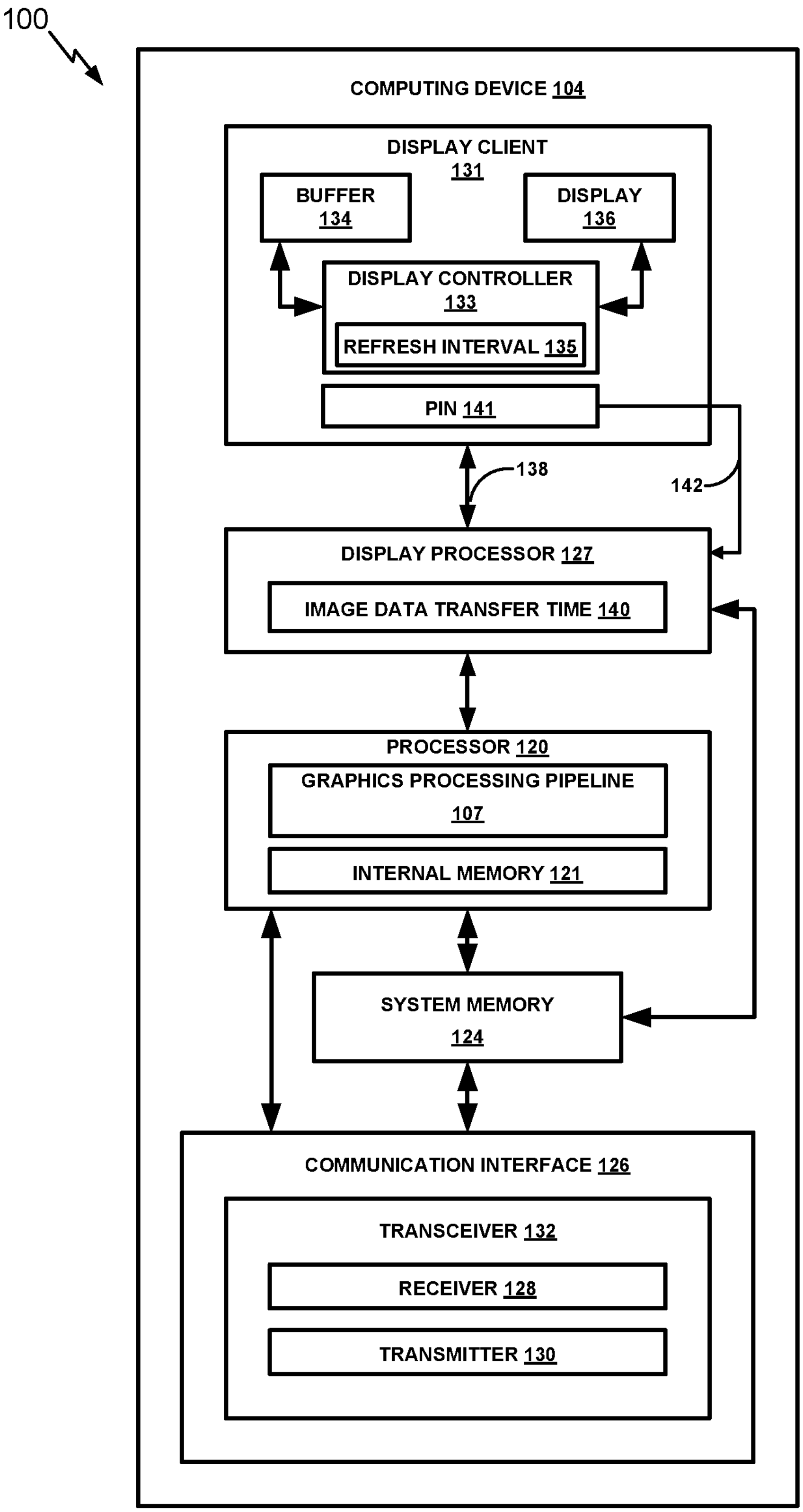
FIG. 1 is a block diagram that illustrates an example computing device configured to compute an image data transfer time and configure a display path to support the computed image data transfer time, in accordance with one or more techniques of this disclosure.

In general, aspects disclosed herein provide techniques for adaptively computing an image data transfer time for transferring data on a display path between a host processor (e.g., a display processing unit (DPU), a graphics processing unit (GPU), and/or a central processing unit (CPU)) and a display panel (e.g., display controller of the display panel). In certain aspects, the image data transfer time is calculated based on a display panel refresh interval of the display panel. In certain aspects, the techniques include configuring one or more components of the display path to support the computed image data transfer time. A display path is a path between a host processor and a display panel. The display path may include one or more components such as one or more of a data link, bus, display serial interface (DSI) network on chip (NOC), system memory (e.g., double data rate synchronous dynamic random-access memory, or "DDR"), etc. An image data transfer time is the time for transferring image data, such as a frame, on the display path from the host processor to the display panel. A panel refresh indication synchronization signal may be called a display panel refresh interval indication, which is sent from the display panel to the host processor. The display panel refresh interval indication indicates the display panel refresh interval for the display panel. The disclosed techniques provide that, based on the display panel refresh interval monitored, the host processor may configure one or more components of the display path to support transfer of image data, such as each frame, in an image data transfer time adaptively determined based on the display panel refresh interval.

In contrast to an implementation that uses a fixed image data transfer time, the present disclosure provides techniques to adaptively compute the image data transfer time based on a display panel refresh interval indicated by the display panel and monitored by the host processor. For example, the host processor may receive from the display panel a display panel refresh interval indication indicating the display panel refresh interval of the display panel. The display panel refresh interval of the display panel corresponds to a time duration of a display period of the display panel. The display panel is configured to refresh each display period. The processor then computes the image data transfer time based on the display panel refresh interval and configures one or more components (e.g., DSI, NOC, DDR, data link, etc.) of the display path to support the computed image data transfer time. The computed image data transfer time may be different from a previously set image data transfer time that is used to configure the one or more components.

Using certain techniques, image data transfer time is preconfigured and not subject to change when the display panel refresh interval varies. For example, a safety margin is provided for a known display panel, which has a statistical attribute regarding the expected variations of its display panel refresh interval. A constant image data transfer time is then determined and used to configure the settings of one or more components along the display path. However, as the operation environment changes (such as temperature variations and the like), and/or as the display panel ages, the display panel refresh interval of the display panel may exceed the expected variation, so that the actual display panel refresh interval of the display panel is even less than the safety margin, causing the configurations of the one or more components along the display path inapplicable, resulting in display failures, such as image jitter. The image jitter may further cause user interface (UI) jank. For example, the software hardcode for image data transfer time may need to balance: power of the application processor, DSI bit clock upper limit, and device failure rate. If the software configured image data transfer time value is too low such that it is lower than needed to accommodate the actual display panel refresh interval, DPU, DSI, NOC, and/or DDR clock may need to be configured to accommodate the lower refresh interval, thereby leading to excess power consumption to run the components faster than is necessary. If the image data transfer time is too high such that it cannot accommodate the actual display panel refresh interval, UI jank will result.

The present disclosure provides advantageous techniques that, in certain aspects, adaptively configure the one or more components along the display path based on an actively monitored refresh interval of the display panel. As a result, in certain aspects, performance of the display panel is improved, display panel failure rates decrease, and power efficiency is increased. In certain aspects, the techniques are applicable to digital devices with display panels operable in the command mode. In certain aspects, in addition, compared to DSI clock calibration methods, the techniques disclosed do not depend on DSI bit clock. For example, some display path may use DSI bit clock calibration to configure DDIC clock generator and set a fixed DSI bit clock. Such method loses the dynamic DSI bit clock feature and cost high power consumption. The high power consumption may be more significant when the display panel is configured at a lower frames-per-second (FPS). The DSI bit clock calibration method may thus suffer from a lack of UI smoothness. In certain aspects, the disclosed techniques overcome the shortcomings of the DSI bit clock calibration method—the techniques are compatible with dynamic DSI bit clock adjusting for radio frequency (RF), save power, are compatible with FPS switching, and can boost image data transfer rate (i.e., reduce image data transfer time) when needed, resulting in smooth UI experience.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory.

Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," "image," and vice versa. This is true regardless of whether the terms are being used as an adjective, noun, or other parts of speech. In some examples, as used herein, the term "graphical content" may refer to content produced by one or more processes of a graphics processing pipeline. In some examples, as used herein, the term "graphical content" may refer to content produced by a processing unit configured to perform graphics processing. In some examples, as used herein, the term "graphical content" may refer to content produced by a graphics processing unit.

In some examples, as used herein, the term "display content" may refer to content generated by a processing unit configured to perform display processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame.

As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example system 100 that includes an example computing device 104 configured to compute an image data transfer time 140 and configure a display path 138 to support the computed image data transfer time 140, in accordance with one or more techniques of this disclosure. The computing device 104 may include one or more components or circuits for performing various functions described herein. In some examples, one or more components of the computing device 104 may be components of an SOC. The computing device 104 may include one or more components configured to perform one or more techniques of this disclosure. In the example shown, the computing device 104 may include a processor 120 and a system memory 124.

In some examples, the computing device 104 can include a number of additional or alternative components, e.g., a communication interface 126, a transceiver 132, a receiver 128, a transmitter 130, a display processor 127, and a display client 131. Reference to the display client 131 may refer to one or more displays. For example, the display client 131 may include a single display or multiple displays. The display client 131 may include a first display (panel) and a second display (panel), or a foldable or separable display. In other examples, the results of the graphics processing may not be displayed on the device, e.g., the first and second displays may not receive any frames for presentment thereon. Instead, the frames or graphics processing results may be transferred to another device. In some aspects, this can be referred to as split-rendering.

The display client 131 may receive image data from and be controlled by the processor 120 and/or the display processor 127. The processor 120 may include an internal memory 121. The processor 120 may be configured to perform graphics processing, such as in a graphics processing pipeline 107. In some examples, the computing device 104 may include a display processor or display processing unit, such as the display processor 127, to perform one or more display processing techniques on one or more frames generated by the processor 120 before presentment by the display client 131. The display processor 127 may be configured to perform display processing. For example, the display processor 127 may be configured to perform one or more display processing techniques on one or more frames generated by the processor 120. The display processor 127 may output image data to the display client 131 according to an interface protocol, such as, for example, the MIPI DSI (Mobile Industry Processor Interface, Display Serial Interface).

The display client 131 may be configured to display or otherwise present frames processed by the display processor 127. In some examples, the display client 131 may include one or more of: a liquid crystal display (LCD), a plasma display, an organic light emitting diode (OLED) display, a projection display device, an augmented reality display device, a virtual reality display device, a head-mounted display, or any other type of display device.

In the illustrated example of FIG. 1, the display client 131 includes a display controller 133, a buffer 134, a display 136, and a pin 141. The example display 136 includes a plurality of pixel elements for displaying image data. The display controller 133 may be a display driver integrated circuit (DDIC). The display controller 133 may receive image data from the display processor 127 and store the received image data in the buffer 134. In some examples, the display controller 133 may output the image data stored in the buffer 134 to the display 136. Thus, the buffer 134 may represent a local memory to the display client 131. In some examples, the display controller 133 may output the image data received from the display processor 127 to the display 136. In some aspects, the display controller 133 is a controller in the display panel that controls refresh of the display 136. The display controller 133 drives the display 136 to display received image data.

The display controller 133 may specify an internal refresh interval 135, such as by using an internal clock. The refresh interval 135 is the time used to refresh the display 136 for a display period (e.g., frame, refresh cycle, etc.). For example, the display 136 may refresh at a particular frequency. The refresh interval 135 is the inverse of that particular frequency. The refresh interval 135 may be variable when the display client 131 is operating, such as when the display client 131 is operating in command mode. For example, the display panel refresh interval 135 may change from display period to display period (e.g., frame to frame). The variability may be based on one or more factors, such as temperature of the display, aging of the display from use over time, etc. This variation may be referred to as refresh jitter.

The display client 131 may include a pin 141 configured to send display panel refresh interval indications 142 to the display processor 127, the processor 120, or both. The display panel refresh interval indication 142 is an indication sent from the display client 131 (or from the display controller 133) to the display processor 127. The display panel refresh interval indication 142 indicates the display panel refresh interval 135 for the display 136. The indication 142 may be one or more of: a signal comprising a series of pulses, the time between two consecutive pulses corresponding to the current display panel refresh interval; a packet indicating the display refresh interval; a series of timestamps, the time between two consecutive timestamps corresponding to the current display panel refresh interval, the self-refresh timeline, etc. In some cases, the display panel refresh interval indication 142 may be referred to as TE signals.

Furthermore, as disclosed above, the display client 131 may be configured in accordance with MIPI DSI standards. The MIPI DSI standard supports a video mode and a command mode. In examples where the display client 131 is operating in video mode, the display processor 127 may continuously refresh the graphical content of the display client 131. For example, the entire graphical content may be refreshed per refresh cycle (e.g., line-by-line).

In examples where the display client 131 is operating in command mode, the display processor 127 may write the graphical content of a frame to the buffer 134. In some such examples, the display processor 127 may not continuously refresh the graphical content of the display client 131. Instead, the display processor 127 may use a vertical synchronization (Vsync) pulse to coordinate rendering and consuming of graphical content at the buffer 134. For example, when a Vsync pulse is generated, the display processor 127 may output new graphical content to the buffer 134. Thus, the generating of the Vsync pulse may indicate when current graphical content at the buffer 134 has been rendered.

When operating in command mode, the display processor 127 determines an image data transfer time 140, which may also be referred to as frame transfer time. The image data transfer time 140 includes the time for transferring image data, such as a frame, on the display path 138 from the display processor 127 to the display client 131. The image data transfer time 140 may be separate from a time for rendering image data (e.g., by processor 120) and a time for composing image data (e.g., by display processor 127). In certain aspects, the display processor 127 is configured to calculate the image data transfer time 140.

The display path 138 is the path between the processor (e.g., display processor 127 or processor 120) of the computing device (e.g., computing device 104) and the display panel (e.g., display client 131, such as the display controller 132 of the display client 131). The display path 138 may include one or more components, such as one or more of a data link, bus, display serial interface (DSI), network on chip (NOC), system memory (e.g., the system memory 124, such as DDR memory), etc. For example, the processor 120 or the display processor 127 may retrieve image data (e.g., corresponding to video, still image, a frame, etc.) from the system memory 124 (or dedicated memory in the display processor 127, if any) and send the image data to the display client 131 using the display path 138.

The display processor 127 may configure one or more components of the display path 138 to support the image data transfer time 140. In certain aspects, the display processor 127 controls the time for rendering image data and/or the time for composing image data based on the image data transfer time 140. For example, the image data may need to be rendered, composed, and transferred within a suitable duration to allow new image data to be received for each display panel refresh interval 135. In some aspects, the processor 120 may operate concurrently with, or in the place of the processor 127 to determine the image data transfer time 140 for a respective display path (i.e., from the processor 120 to the display client 131). For example, when the display processor 127 configures one or more components, the display processor 127 may adjust settings of the one or more components when a difference between the computed image data transfer time and a previously computed image data transfer time exceeds a threshold. The display processor 127 may refrain from adjusting the settings of the one or more components when the difference does not exceed the threshold. This may help ensure settings are not constantly being changed, which may cause unnecessary power consumption.

In some cases, the display processor 127 may configure the display path 138, by configuring settings of one or more of the system memory, data link, bus, DSI, NOC, other resources of the computing device 104, etc. to support a particular image data transfer time 140. In order to support a shorter image data transfer time 140, the display processor 127 may configure the display path 138 with settings that cause higher power consumption at the computing device 104, such as to send the image data faster (i.e., a higher transfer rate and a corresponding shorter image data transfer time 140) between the display processor 127 and the display 136.

Similarly, in order to support a longer image data transfer time, the display processor 127 may configure the display path 138 with settings that cause lower power consumption at the computing device 104, such as to send the image data slower (i.e., a lower transfer rate and a corresponding longer image data transfer time 104) between the display processor 127 and the display panel 136. Further, there may be a limit or threshold image data transfer time that the display path can support, meaning the display path 138 cannot send the image data at a rate faster than the threshold, or within an image data transfer time 140 less than the threshold image data transfer time.

In certain aspects, the display processor 127 may determine if the display path 138 is capable of supporting the computed image data transfer time 140. In case when the display path 138 cannot support the computed image data transfer time 140, the display processor 127 may send an indication to the display client 131 indicating the display client 131 to reduce a refresh rate (corresponding to lengthening the refresh interval 135).

In certain aspects, the display client 131 is configured to autonomously refresh the display 136 based on a timing engine (e.g., clock circuit, etc.) of the display controller 133 of the display client 131. For example, the display client 131 may be configured to run in a command mode where the display 136 refreshes autonomously based on a self-refresh timeline/signal generated by the display controller 133. Accordingly, in command mode the display client 131 self-refreshes the display 136 according to a self-refresh timeline that is specific to the display 136. This may be as opposed to when the display client runs in a video mode. In a video mode, the display controller may receive a refresh timeline/signal from the display processor 127 and refresh the display 136 based on the refresh signal received from the display processor 127.

Memory external to the processor 120, such as system memory 124, may be accessible to the processor 120. For example, the processor 120 may be configured to read from and/or write to external memory, such as the system memory 124. The processor 120 may be communicatively coupled to the system memory 124 over a bus. In some examples, the processor 120 and the system memory 124 may be communicatively coupled to each other over the bus or a different connection.

It should be appreciated that in some examples, the computing device 104 may include a content encoder/decoder configured to receive graphical and/or display content from any source, such as the system memory 124 and/or the communication interface 126. The system memory 124 may be configured to store received encoded or decoded content. In some examples, the content encoder/decoder may be configured to receive encoded or decoded content, e.g., from the system memory 124 and/or the communication interface 126, in the form of encoded pixel data. In some examples, the content encoder/decoder may be configured to encode or decode any content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the computing device 104 and moved to another device. As another example, the system memory 124 may not be removable from the computing device 104.

The processor 120 may be a central processing unit (CPU), a graphics processing unit (GPU), a general purpose GPU (GPGPU), or any other processing unit that may be configured to perform graphics processing. In some examples, the processor 120 may be integrated into a motherboard of the computing device 104. In some examples, the processor 120 may be present on a graphics card that is installed in a port in a motherboard of the computing device 104, or may be otherwise incorporated within a peripheral device configured to interoperate with the computing device 104. The processor 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processor 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors. In some aspects, the processor 120 may include or may integrate with the display processor 127.

In some aspects, the system 100 can include a communication interface 126. The communication interface 126 may include a receiver 128 and a transmitter 130. The receiver 128 may be configured to perform any receiving function described herein with respect to the computing device 104. Additionally, the receiver 128 may be configured to receive information, e.g., eye or head position information, rendering commands, or location information, from another device. The transmitter 130 may be configured to perform any transmitting function described herein with respect to the computing device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the computing device 104.

In some examples, the graphical content from the processor 120 for display via the display client 131 may be static or may be changing. Accordingly, the display processor 127 may periodically refresh the graphical content displayed via the display client 131. For example, the display processor 127 may periodically retrieve graphical content from the system memory 124, where the graphical content may have been updated by the execution of an application (and/or the processor 120) that outputs the graphical content to the system memory 124.

In certain aspects, although the display 136 is shown within the display client 131, the display 136 or the display client 131 may refer to two or more display panels. In some cases, two or more display clients similar to the display client 131 may be similarly connected with the display processor 127, processor 120, or both.

As shown in FIG. 1, in certain aspects, the display processor 127 (also referred to as a display processing unit (DPU)) may be configured to operate functions of the display client 131. For example, in certain aspects, the display processor 127 is configured to output a plurality of code words, such as corresponding to a frame, to the display controller 133. Each code word may be represented by a binary number in the digital domain. Each code word may correspond to a pixel (e.g., red, green, blue, white, etc.) of the display 136.

The display controller 133 may be configured to convert the code words received from the display processor 127 to analog signals used to drive the pixels of the display 136. In certain aspects, for each code word corresponding to a pixel, the display controller 133 is configured to convert the code word to an analog signal(s) that drives the pixel to a particular brightness level. Accordingly, in certain aspects, the code word and/or analog signal(s) correspond to a brightness level for the pixel.

In certain aspects, the processor 120, the display processor 127, or both, may be configured to receive the display panel refresh interval indication 142 from the display client 131. The display panel refresh interval indication 142 indicates the display panel refresh interval 135 that corresponds to a time duration of a display period of the display panel 136. The display panel 136 is configured to refresh each display period. The image data transfer time 140 may be computed based on the display panel refresh interval 135. The display processor 127 configures one or more components of the display path 138 to support the computed image data transfer time 140.

In some cases, the display processor 127 receives one or more display panel refresh interval indications 142 indicating a plurality of display panel refresh intervals 135 of the display client 131 corresponding to a plurality of display periods of the display client 131. As such, computing the image data transfer time 140 may include applying a temporal filter to the plurality of display panel refresh intervals 135 to generate a filtered display panel refresh interval (not shown) and computing the image data transfer time 140 based on the filtered display panel refresh interval. For example, the temporal filter may compute the filtered display panel refresh interval as one of a mean, mode, median, minimum, or maximum of the plurality of display panel refresh intervals. In certain aspects, computing the image data transfer time 140 based on the filtered display panel refresh interval comprises computing the image data transfer time 140 based on the filtered display panel refresh interval minus an image data control overhead time for controlling display of the image data on the display panel.

In some cases, the image data transfer time 140 may be computed based on an image data control overhead time for controlling display of the image data on the display 136. The image data control overhead time may be fixed. For example, the image data transfer time may be computed based on the display panel refresh interval 135 minus the image data control overhead time. The image data control overhead time is a time allocated by the computing device 104 for overhead for controlling display of image data at the display 136 for a single display period. For example, the image data control overhead time includes software control delay. In some aspects, the value of the image data control overhead time is constant or fixed, for example, when executing the same software control over a given hardware configuration.

As described herein, a device, such as the computing device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

Figure 2:
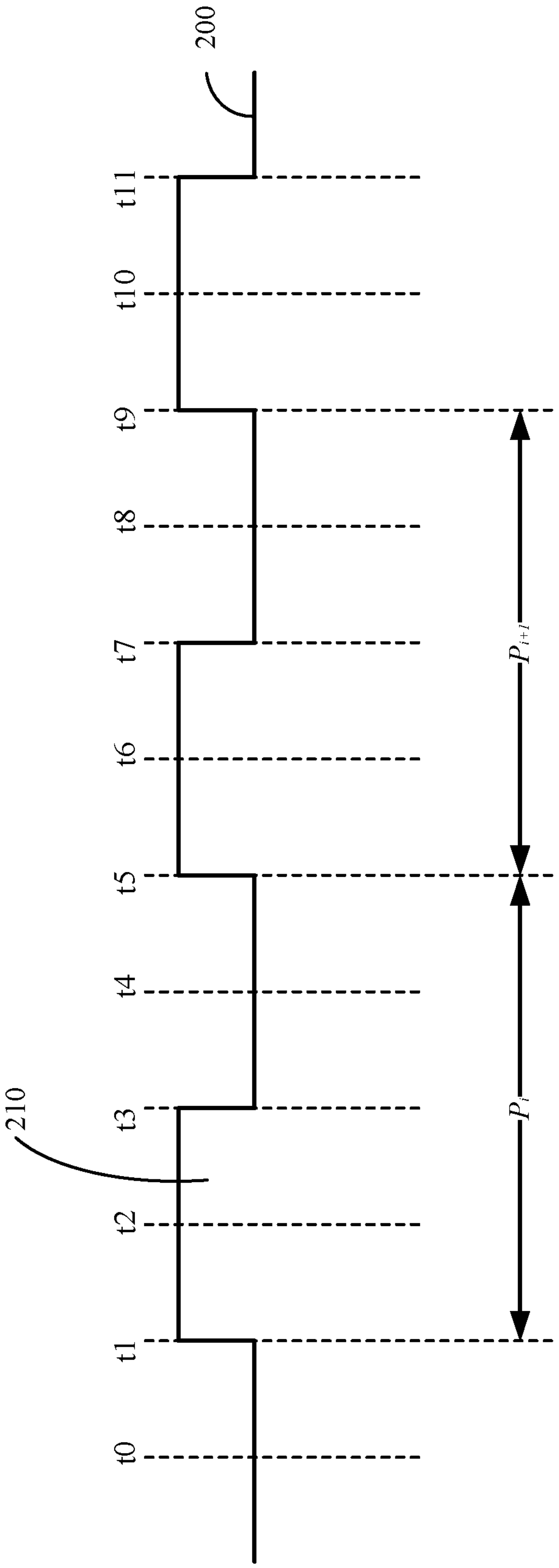
FIG. 2 illustrates an example timeline of display panel refresh intervals, in accordance with one or more techniques of this disclosure.

FIG. 2 illustrates an example refresh timeline 200 of display panel refresh intervals, in accordance with one or more techniques of this disclosure. The example refresh timeline 200 represents a signal used to refresh a display (such as the display 136 of FIG. 1). The refresh timeline 200 includes a series of pulses 210, which start (e.g., each pulse 210 has a rising edge, such as the rising edge at $t_1$) and end (e.g., each pulse 210 has a trailing edge, such as the trailing edge at $t_3$). There may also be a time period P between pulses, such as $P_i$ and $P_{i+1}$ as shown, wherein i is the label or index of one of the pulse 210 from 1 to any integer greater than 1. In more general terms, a display period P may be the time duration of a pulse plus the time period between pulses. A duration of the display period is the display panel refresh interval, such as the refresh interval 135 of FIG. 1. In certain aspects, the refresh timeline 200 corresponds to a synchronization signal (e.g., vertical synchronization ($v_{sync}$) signal) that may be used as the display panel refresh interval indication 142.

In some aspects, $P_i$ and $P_{i+1}$ are desired to be the same to provide synchronization signals of a constant frequency. In practice, however, $P_i$ and $P_{i+1}$ are often different (though within certain statistically controlled variations as manufactured). As discussed above, high temperatures, aging, and other hardware changes would further alter the display period P, resulting $P_i \neq P_{i+1}$, and/or excessive difference variations. In certain contexts, the variation in the self-refreshing frequency (i.e., inverse of periodicity) of a display panel may be referred to as TE jitter, having a value such as ±2%, ±5%, or other ranges depending on quality control. The range may be referred to as the display panel typical value for typical temperature range. A safety margin may be imposed to enlarge this range. For example, when a display panel has an expected TE jitter at ±2%, the display panel manufacturer may set an expected variation to ±4% or more, and may evaluate failure rate or compliance rate based on the expected variation value.

For example, given a display panel that has a self-refreshing rate of 120 Hz and an expected TE jitter at ±2%, an expected variation may be set at ±4%, which results in the refresh interval varying between 8.01 ms and 8.67 ms (determined by 1/120*(1±4%)). Because failure occurs when there is not sufficient image data transfer time, the lower value is taken. Suppose there is a 0.8 ms control delay (or the image data control overhead time discussed above), the image data transfer time then should be at least 8.01−0.8=7.21 ms. The one or more components on the display path (e.g., the display path 138) should have settings (e.g., clock values for DPU, DSI, NOC, or DDR) adjusted using this least image data transfer time. However, such fixed setting based on the safety margin cannot avoid failures when the actual variation of the refresh interval exceeds the ±4% expected value.

The disclosed techniques, instead of using the expected variation, monitor the actual, varying display panel refresh interval (such as using the display panel refresh interval indication 142 in FIG. 1) and determine a corresponding image data transfer time (such as the image data transfer time 140 in FIG. 1) adaptively, to avoid display failures even when the variation of the refresh interval significantly exceeds the expected value. Example operations are described below.

Figure 3:
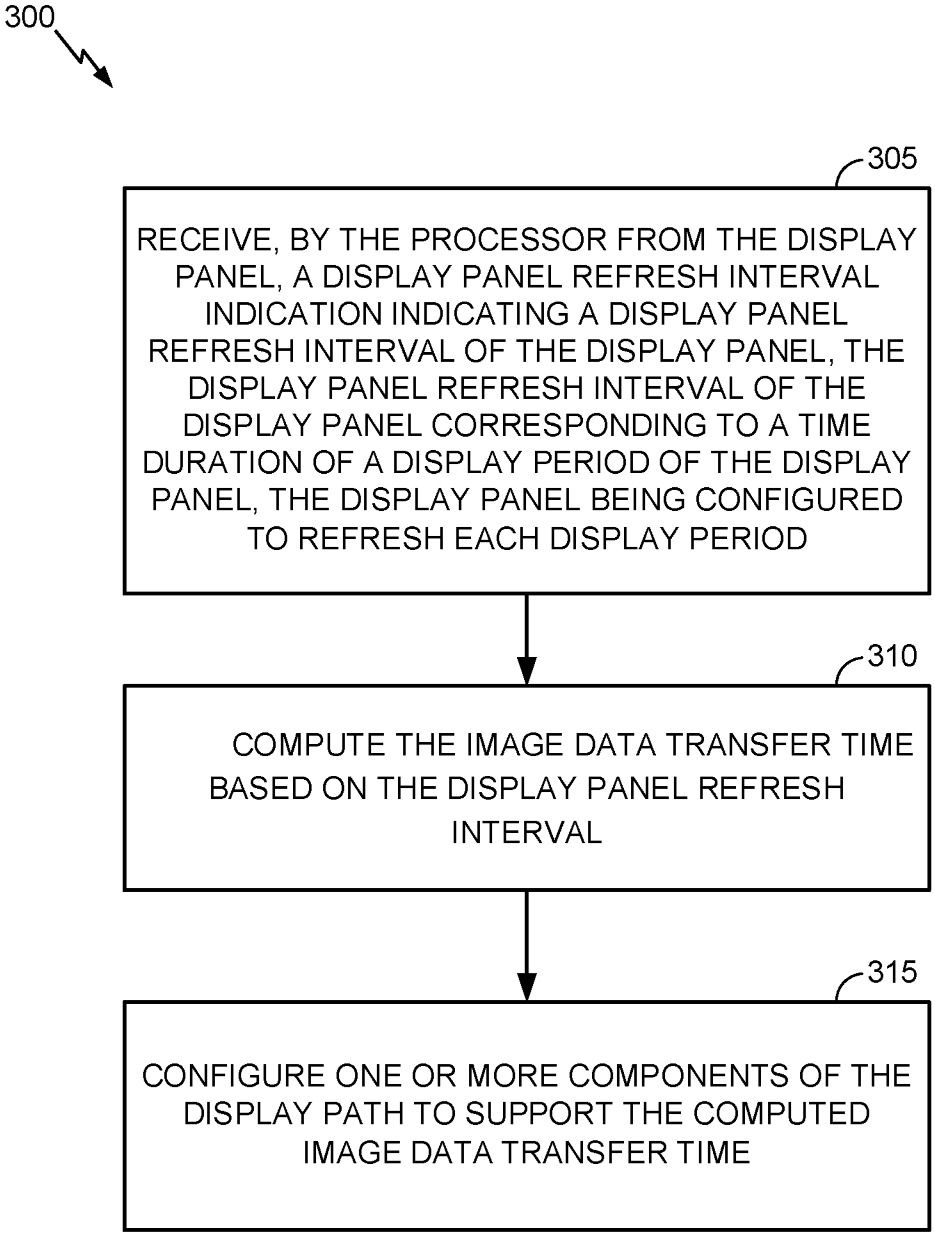
FIG. 3 illustrates example operations for a computing device to configure a display path to support a computed image data transfer time, according to certain aspects of the present disclosure.

FIG. 3 illustrates example operations 300 for a computing device to configure a display path to support a computed image data transfer time, according to certain aspects of the present disclosure. The example operations 300 may be performed on a computing device or a computing system. In some embodiments, the computing device includes a processor and an integral display; the computing system may include an external display (either the internal display or the external display may be referred to as "display panel"). The example operations 300 may be performed by various components forming the computing device or computing system, even if such various components may be far apart.

As shown in FIG. 3, at 305, operations 300 begins by receiving, by the processor from the display panel, a display panel refresh interval indication indicating a display panel refresh interval of the display panel. The display panel refresh interval of the display panel corresponds to a time duration of a display period of the display panel. The display panel is configured to refresh each display period. For example, the display panel refresh interval indication may be a TE signal that is represented by a pulse. The processor may monitor and record the TE signal input and the display panel refresh interval. The display panel refresh intervals may be 8.2 ms, 8.3 ms, 7.5 ms, 7.4 ms, and so on (i.e., not a constant value in actual measurements).

At 310, the image data transfer time is computed based on the display panel refresh interval. For example, the processor may apply a temporal filter to the display panel refresh intervals to generate a filtered display panel refresh interval, such as 7.5 ms for example. The image data transfer time is computed based on the filtered display panel refresh interval. The temporal filter may compute the filtered display panel refresh interval as one of a mean, mode, median, minimum, or maximum of the plurality of display panel refresh intervals. In some aspects, the image data transfer time may be computed based on the filtered display panel refresh interval minus an image data control overhead time for controlling display of the image data on the display panel. For example, the image data control overhead time may be 0.8 ms. The image data transfer time is thus 6.7 ms. This transfer time reflects the present actual refreshing rate of the display panel and may change based on the actual refreshing rate measured.

At 315, one or more components of the display path are configured to support the computed image data transfer time. For example, before calculating the 6.7 ms image data transfer time above, the existing or previous image data transfer time may be set at 7.5 ms and the one or more components may be configured accordingly. Upon determining the current image data transfer time of 6.7 ms, the clock configurations of the one or more components, such as DPU, DSI, DDR, NOC, and others that are on the display path, can be updated during run time. Such tuning may continue as the display panel refresh interval indication is actively monitored.

In some cases, configuring the one or more components includes adjusting settings of the one or more components when a difference between the computed image data transfer time and a previously computed image data transfer time exceeds a threshold; and refraining from adjusting the settings of the one or more components when the difference does not exceed the threshold. In some cases, the processor may determine if the display path is capable of supporting the computed image data transfer time. When the display path is not capable of supporting the computed image data transfer time, the processor may send an indication to the display panel indicating the display panel to reduce a refresh rate of the display panel.

In some implementations, operations 300 may further include receiving, by the processor from a second display panel, a second display panel refresh interval indication indicating a second display panel refresh interval of the second display panel. A second image data transfer time may be computed for sending image data from the processor to the second display panel along a second display path. At least one of the one or more components is also part of the second display path. The one or more components may be configured to also support the second image data transfer time. In some aspects, at least one of a rendering time or a composing time of the image data is configured based on the computed image data transfer time.

In one configuration, a method or apparatus for display processing is provided. The apparatus may be a processing unit, a display processor, a display processing unit (DPU), a graphics processing unit (GPU), a video processor, or some other processor that can perform display processing. In some examples, the apparatus may be the processor 120 within the computing device 104, or may be some other hardware within the computing device 104, or another device.

In accordance with this disclosure, the term “or” may be interrupted as “and/or” where context does not dictate otherwise. Additionally, while phrases such as “one or more” or “at least one” or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term “processing unit” has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave.

Data storage media may be any available media that can be accessed by one or more computers or one or more processors to retrieve instructions, code, and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term “processor,” as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method for configuring an image data transfer time for sending image data from a processor to a display panel along a display path, the method comprising:

receiving, by the processor from the display panel, a display panel refresh interval indication indicating a display panel refresh interval of the display panel, the display panel refresh interval of the display panel corresponding to a time duration of a display period of the display panel, the display panel being configured to refresh each display period;

computing the image data transfer time based on the display panel refresh interval; and configuring one or more components of the display path to support the computed image data transfer time, wherein receiving the display panel refresh interval indication comprises receiving one or more display panel refresh interval indications indicating a plurality of display panel refresh intervals of the display panel corresponding to a plurality of display periods of the display panel, and wherein computing the image data transfer time comprises:

applying a temporal filter to the plurality of display panel refresh intervals to generate a filtered display panel refresh interval; and computing the image data transfer time based on the filtered display panel refresh interval.

2. The method of claim 1, wherein the temporal filter computes the filtered display panel refresh interval as one of a mean, mode, median, minimum, or maximum of the plurality of display panel refresh intervals.

3. The method of claim 1, wherein computing the image data transfer time based on the filtered display panel refresh interval comprises computing the image data transfer time based on the filtered display panel refresh interval minus an image data control overhead time for controlling display of the image data on the display panel.

4. The method of claim 1, wherein computing the image data transfer time is further based on an image data control overhead time for controlling display of the image data on the display panel.

5. The method of claim 3, wherein the image data control overhead time is fixed.

6. The method of claim 4, wherein computing the image data transfer time based on the display panel refresh interval comprises computing the image data transfer time based on the display panel refresh interval minus the image data control overhead time.

7. The method of claim 1, wherein configuring the one or more components comprises:

adjusting settings of the one or more components when a difference between the computed image data transfer time and a previously computed image data transfer time exceeds a threshold; and refraining from adjusting the settings of the one or more components when the difference does not exceed the threshold.

8. The method of claim 1, further comprising:

determining if the display path is capable of supporting the computed image data transfer time; and when the display path is not capable of supporting the computed image data transfer time, sending, from the processor to the display panel, an indication indicating the display panel to reduce a refresh rate of the display panel.

9. The method of claim 1, further comprising:

receiving, by the processor from a second display panel, a second display panel refresh interval indication indicating a second display panel refresh interval of the second display panel; and computing a second image data transfer time for sending image data from the processor to the second display panel along a second display path, wherein at least one of the one or more components is also part of the second display path, wherein configuring the one or more components comprises configuring the one or more components to also support the second image data transfer time.

10. The method of claim 1, further comprising configuring at least one of a rendering time or a composing time of the image data based on the computed image data transfer time.

11. A computing device comprising:

a display panel;

a display path; and a processor configured to:

receive, from the display panel, a display panel refresh interval indication indicating a display panel refresh interval of the display panel, the display panel refresh interval of the display panel corresponding to a time duration of a display period of the display panel, the display panel being configured to refresh each display period;

compute an image data transfer time based on the display panel refresh interval, the image data transfer time being a time for sending image data from the processor to the display panel along the display path; and configure one or more components of the display path to support the computed image data transfer time, wherein receiving the display panel refresh interval indication comprises receiving one or more display panel refresh interval indications indicating a plurality of display panel refresh intervals of the display panel corresponding to a plurality of display periods of the display panel, and wherein computing the image data transfer time comprises:

applying a temporal filter to the plurality of display panel refresh intervals to generate a filtered display panel refresh interval; and computing the image data transfer time based on the filtered display panel refresh interval.

12. The computing device of claim 11, wherein the temporal filter computes the filtered display panel refresh interval as one of a mean, mode, median, minimum, or maximum of the plurality of display panel refresh intervals.

13. The computing device of claim 11, wherein computing the image data transfer time based on the filtered display panel refresh interval comprises computing the image data transfer time based on the filtered display panel refresh interval minus an image data control overhead time for controlling display of the image data on the display panel.

14. The computing device of claim 11, wherein computing the image data transfer time is further based on an image data control overhead time for controlling display of the image data on the display panel.

15. The computing device of claim 13, wherein the image data control overhead is fixed.

16. The computing device of claim 14, wherein computing the image data transfer time based on the display panel refresh interval comprises computing the image data transfer time based on the display panel refresh interval minus the image data control overhead time.

17. The computing device of claim 11, wherein the processor is configured to configure the one or more components by:

adjusting settings of the one or more components when a difference between the computed image data transfer time and a previously computed image data transfer time exceeds a threshold; and refraining from adjusting the settings of the one or more components when the difference does not exceed the threshold.

18. The computing device of claim 11, wherein the processor is further configured to:

determine if the display path is capable of supporting the computed image data transfer time; and when the display path is not capable of supporting the computed image data transfer time, send, to the display panel, an indication indicating the display panel to reduce a refresh rate of the display panel.

19. The computing device of claim 11, wherein the processor is further configured to:

receive, from a second display panel, a second display panel refresh interval indication indicating a second display panel refresh interval of the second display panel; and compute a second image data transfer time for sending image data from the processor to the second display panel along a second display path, wherein at least one of the one or more components is also part of the second display path, wherein configuring the one or more components comprises configuring the one or more components to also support the second image data transfer time.

20. The computing device of claim 11, wherein the processor is further configured to configure at least one of a rendering time or a composing time of the image data based on the computed image data transfer time.

21. A non-transitory computer readable medium having instructions stored thereon that when executed by a processor cause the processor to perform a method for configuring an image data transfer time for sending image data from the processor to a display panel along a display path, the method comprising:

receiving, by the processor from the display panel, a display panel refresh interval indication indicating a display panel refresh interval of the display panel, the display panel refresh interval of the display panel corresponding to a time duration of a display period of the display panel, the display panel being configured to refresh each display period;

computing the image data transfer time based on the display panel refresh interval; and configuring one or more components of the display path to support the computed image data transfer time, wherein receiving the display panel refresh interval indication comprises receiving one or more display panel refresh interval indications indicating a plurality of display panel refresh intervals of the display panel corresponding to a plurality of display periods of the display panel, and wherein computing the image data transfer time comprises:

applying a temporal filter to the plurality of display panel refresh intervals to generate a filtered display panel refresh interval; and computing the image data transfer time based on the filtered display panel refresh interval.

22. The non-transitory computer readable medium of claim 21, wherein the temporal filter computes the filtered display panel refresh interval as one of a mean, mode, median, minimum, or maximum of the plurality of display panel refresh intervals.

23. The non-transitory computer readable medium of claim 21, wherein computing the image data transfer time based on the filtered display panel refresh interval comprises computing the image data transfer time based on the filtered display panel refresh interval minus an image data control overhead time for controlling display of the image data on the display panel.

24. The non-transitory computer readable medium of claim 21, wherein computing the image data transfer time is further based on an image data control overhead time for controlling display of the image data on the display panel.

25. The non-transitory computer readable medium of claim 23, wherein the image data control overhead time is fixed.

26. The non-transitory computer readable medium of claim 24, wherein computing the image data transfer time based on the display panel refresh interval comprises computing the image data transfer time based on the display panel refresh interval minus the image data control overhead time.

27. The non-transitory computer readable medium of claim 21, wherein configuring the one or more components comprises:

adjusting settings of the one or more components when a difference between the computed image data transfer time and a previously computed image data transfer time exceeds a threshold; and refraining from adjusting the settings of the one or more components when the difference does not exceed the threshold.

28. The non-transitory computer readable medium of claim 21, the method further comprising:

determining if the display path is capable of supporting the computed image data transfer time; and when the display path is not capable of supporting the computed image data transfer time, sending, from the processor to the display panel, an indication indicating the display panel to reduce a refresh rate of the display panel.

29. The non-transitory computer readable medium of claim 21, the method further comprising:

receiving, by the processor from a second display panel, a second display panel refresh interval indication indicating a second display panel refresh interval of the second display panel; and computing a second image data transfer time for sending image data from the processor to the second display panel along a second display path, wherein at least one of the one or more components is also part of the second display path, wherein configuring the one or more components comprises configuring the one or more components to also support the second image data transfer time.

30. The non-transitory computer readable medium of claim 21, the method further comprising configuring at least one of a rendering time or a composing time of the image data based on the computed image data transfer time.

31. A computing device comprising:

means for receiving, from a display panel, a display panel refresh interval indication indicating a display panel refresh interval of the display panel, the display panel refresh interval of the display panel corresponding to a time duration of a display period of the display panel, the display panel being configured to refresh each display period;

means for computing an image data transfer time based on the display panel refresh interval, the image data transfer time for sending image data to the display panel along a display path; and means for configuring one or more components of the display path to support the computed image data transfer time, wherein the means for receiving the display panel refresh interval indication is configured to receive one or more display panel refresh interval indications indicating a plurality of display panel refresh intervals of the display panel corresponding to a plurality of display periods of the display panel, and the means for computing the image data transfer time is configured to:

apply a temporal filter to the plurality of display panel refresh intervals to generate a filtered display panel refresh interval; and compute the image data transfer time based on the filtered display panel refresh interval.

32. The computing device of claim 31, wherein the temporal filter computes the filtered display panel refresh interval as one of a mean, mode, median, minimum, or maximum of the plurality of display panel refresh intervals.

33. The computing device of claim 31, wherein computing the image data transfer time based on the filtered display panel refresh interval comprises computing the image data transfer time based on the filtered display panel refresh interval minus an image data control overhead time for controlling display of the image data on the display panel.

34. The computing device of claim 31, wherein the means for computing the image data transfer time is further configured to compute the image data transfer time based on an image data control overhead time for controlling display of the image data on the display panel.

35. The computing device of claim 33, wherein the image data control overhead time is fixed.

36. The computing device of claim 34, wherein the means for computing the image data transfer time is configured to compute the image data transfer time based on the display panel refresh interval minus the image data control overhead time.

37. The computing device of claim 31, wherein the means for configuring the one or more components is configured to:

adjust settings of the one or more components when a difference between the computed image data transfer time and a previously computed image data transfer time exceeds a threshold; and refrain from adjusting the settings of the one or more components when the difference does not exceed the threshold.

38. The computing device of claim 31, further comprising:

means for determining if the display path is capable of supporting the computed image data transfer time; and when the display path is not capable of supporting the computed image data transfer time, means for sending, to the display panel, an indication indicating the display panel to reduce a refresh rate of the display panel.

39. The computing device of claim 31, further comprising:

means for receiving, from a second display panel, a second display panel refresh interval indication indicating a second display panel refresh interval of the second display panel; and means for computing a second image data transfer time for sending image data to the second display panel along a second display path, wherein at least one of the one or more components is also part of the second display path, wherein the means for configuring the one or more components is configured to configure the one or more components to also support the second image data transfer time.

40. The computing device of claim 31, further comprising means for configuring at least one of a rendering time or a composing time of the image data based on the computed image data transfer time.

* * * * *